Figure 1:
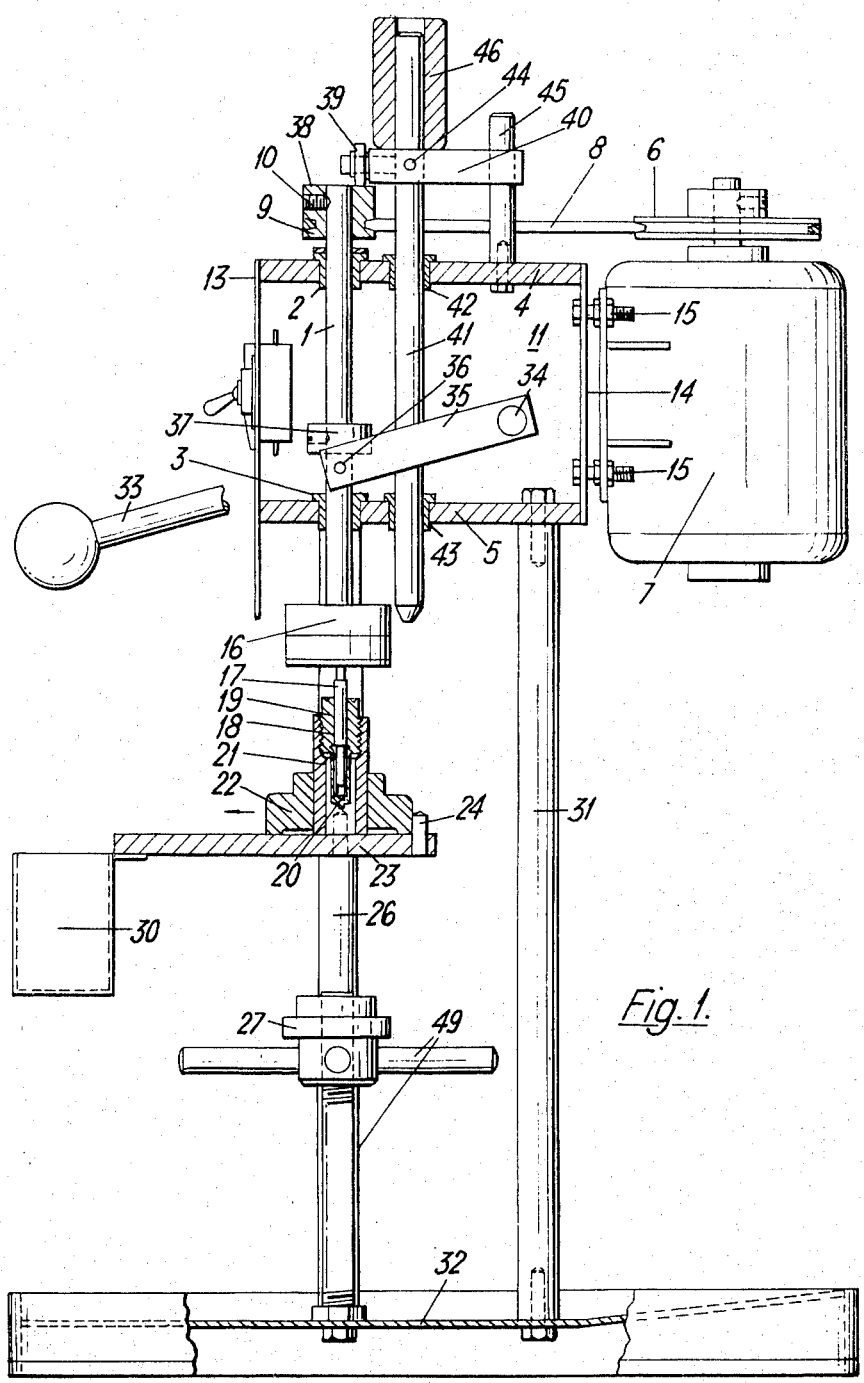

United States Patent
Taylor

[15] 3,686,797
[45] Aug. 29, 1972

[54] MACHINE FOR MACHINING INTERNAL SURFACES OF WORKPIECES

[72] Inventor: Cecil I. Taylor, Buckingham, England

[73] Assignee: Leslie Hartridge Limited, Buckingham, England

[22] Filed: July 28, 1970

[21] Appl. No.: 58,953

[52] U.S. Cl. ............................................. 51/34 K
[51] Int. Cl. ......................... B24b 7/00, B24b 9/00
[58] Field of Search ............. 51/34 H, 34 J, 34 K, 59

[56] References Cited

UNITED STATES PATENTS

| | | | |
|---|---|---|---|
| 2,653,595 | 9/1953 | Higgins | 51/34 K X |
| 845,687 | 2/1907 | Brown | 51/34 K UX |
| 463,973 | 11/1891 | Palmer | 51/34 K UX |
| 2,426,028 | 8/1947 | Krueger | 51/34 K |
| 2,200,573 | 5/1940 | Connor | 51/34 K |
| 2,108,029 | 2/1938 | Connor | 51/34 K X |

*Primary Examiner*—James L. Jones, Jr.
*Attorney*—Berman, Davidson and Berman

[57] ABSTRACT

The invention resides in a machine for use in machining internal surfaces of workpieces comprising means to hold a workpiece which is to be machined, a machine spindle, means mounted at one end of the machine spindle to hold the tool so that the tool rotates when the machine spindle rotates, a support for the workholder, the support and the tool holder being relatively movable towards and away from each other, and means associated with the machine spindle adapted to apply intermittently variable axial pressure to the tool in a direction towards the workholder support during the revolutions of the machine spindle.

8 Claims, 15 Drawing Figures

Inventor
CECIL I. TAYLOR,

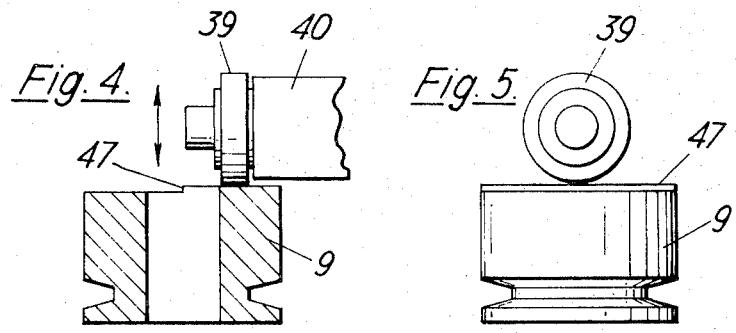
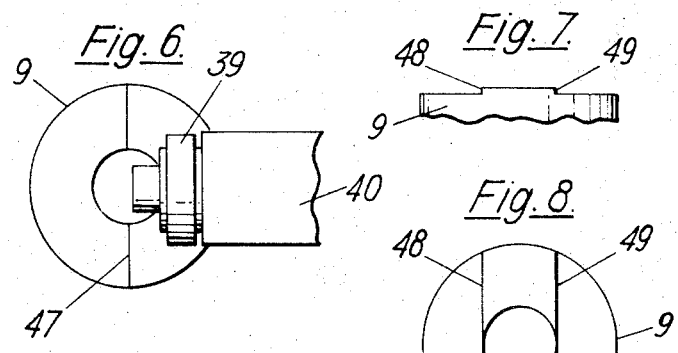
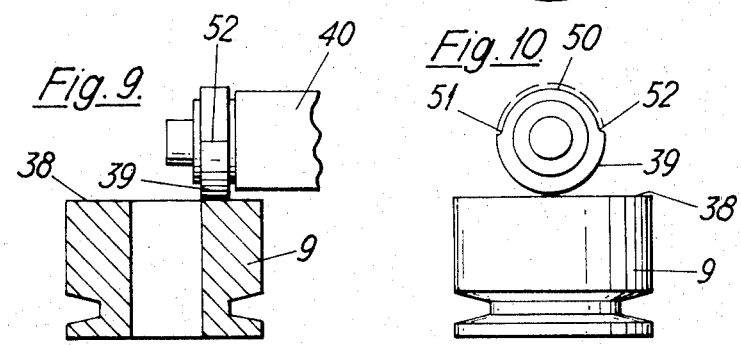
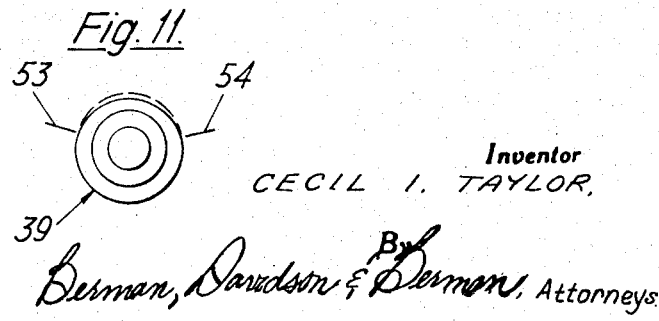

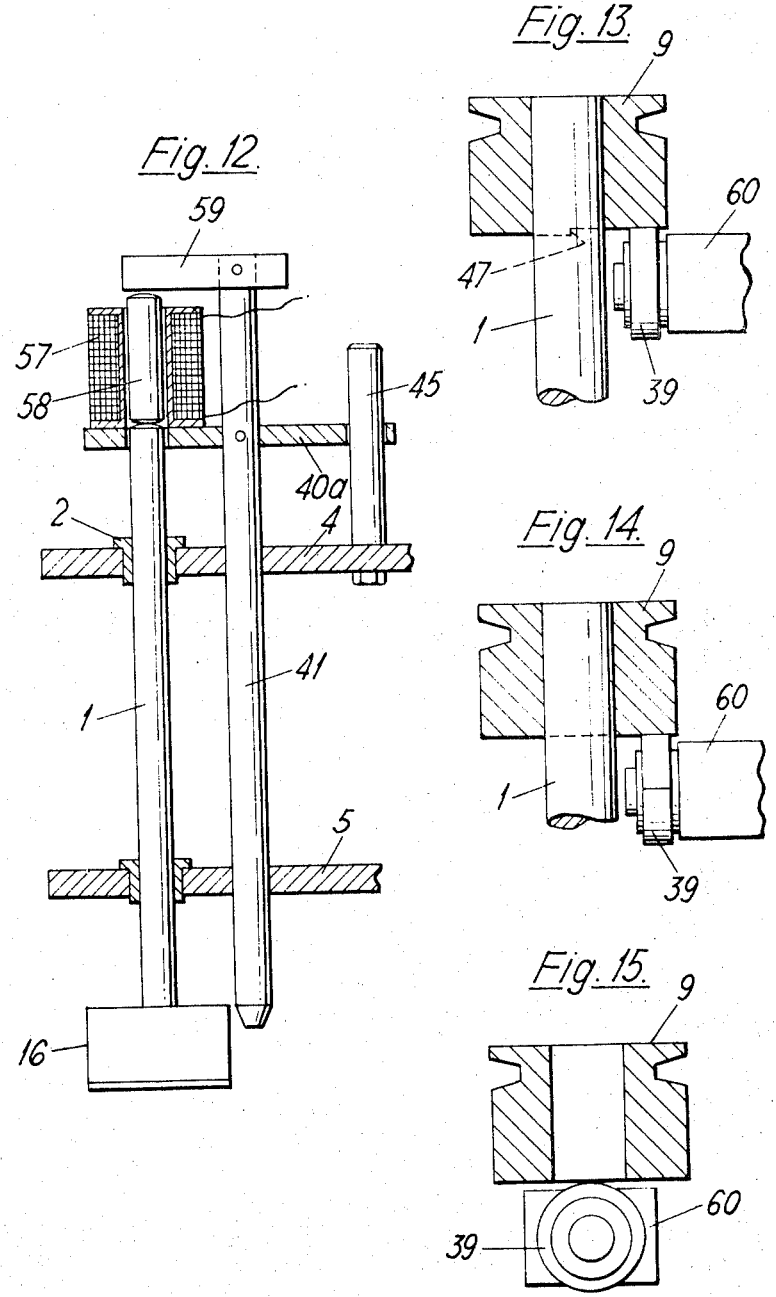

MACHINE FOR MACHINING INTERNAL SURFACES OF WORKPIECES

This invention relates to a machine for use in machining or remachining or reconditioning internal surfaces of articles, for example, the valve seats of fuel injector atomizer nozzles for compression ignition internal combustion engines, injector and nozzle bodies and other articles such as wire drawing dies and the like. For convenience the term "machining" will be used throughout the following description but it is to be understood that the word includes various operations, e.g., lapping, remachining and reconditioning operations, and the articles will be referred to as workpieces.

The principal object of the present invention is to provide a machine for machining the internal surfaces of articles whereby machining for a given rate of rotation of a selected tool is more rapid than has been the case hitherto so that a higher production rate of workpieces containing such surfaces is achieved.

Experiments have shown that the above mentioned object is attained if the tool whilst rotating has applied to it a vibratory or variable load. The invention, therefore, resides in a machine for use in machining internal surfaces of workpieces comprising means to hold a workpiece which is to be machined, a machine spindle, means mounted at one end of the machine spindle to hold the tool so that the tool rotates when the machine spindle rotates, a support for the workholder, the support and the tool holder being relatively moveable towards and away from each other, and means associated with the machine spindle adapted to apply intermittently variable axial pressure to the tool in a direction towards the workholder support during the revolutions of the machine spindle. Thus the said variable pressure is applied by the tool tip to the surface on which the tool works. The intermittent variation of pressure may be produced by imparting light axially directed blows or taps to the machine spindle, preferably whilst it is in contact with the surface being machined, or by axially vibrating the tool.

The means to impart axially directed blows or taps to the tool may comprise one or more steps formed on the upper surface of a pulley fixed to the machine spindle for driving the machine spindle, said spindle being substantially vertical, a roller rotatable on an axis substantially perpendicular to the machine spindle axis, and a weight arranged to apply a downthrust to said roller, said roller being arranged to rise and fall as it runs over the step or steps and to cause the weight to rise and fall whereby the weight by reason of its kinetic energy imparts an increased downthrust to the roller every time the weight reaches the limit of its descent.

In an alternative arrangement the upper surface of the pulley may be flat and the periphery of the roller may be provided with one or more steps.

Instead of the step or steps formed on the upper surface of the pulley the roller periphery may be eccentric with respect to its spindle.

The weight may be supported on a platform having the roller spindle attached to one end thereof, and the roller may be in the form of a ball bearing. The weight is preferably mounted on the platform by means permitting it to rise and fall relatively to the platform.

The weight may be removably mounted on the platform so that it may be replaced by another of different mass.

The means for axially vibrating the tool may comprise any one of the rollers above set forth, located at and in contact with the underside of the said pulley, the said underside having one or more steps on it when a non-stepped roller having its periphery concentric with its spindle axis is employed. When the machine spindle is rotating the step or each step on the underside of the pulley, or the step or each step on the roller, or the lobe of the eccentric roller when used, contact with the roller or underside of the pulley as the case may be the machine spindle and tool holder and hence the tool is rapidly raised slightly and then dropped with the result that the tool strikes the internal surface of the workpiece as if the tool had received a downward blow. The machine spindle may be loaded by a weight, which may be interchangeable with others, so that the weight when in position adds force to the blows which the tool impresses on the workpiece.

Figure 2:
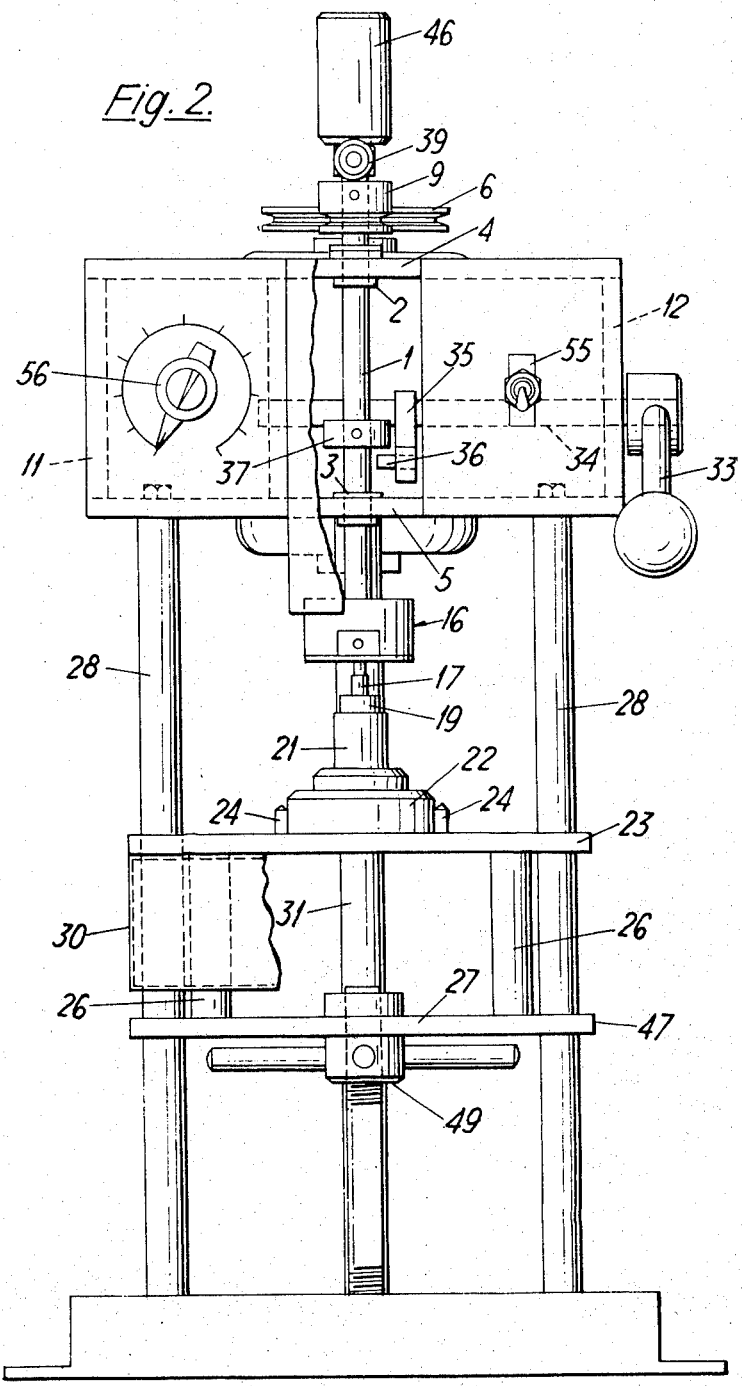
Figure 3:
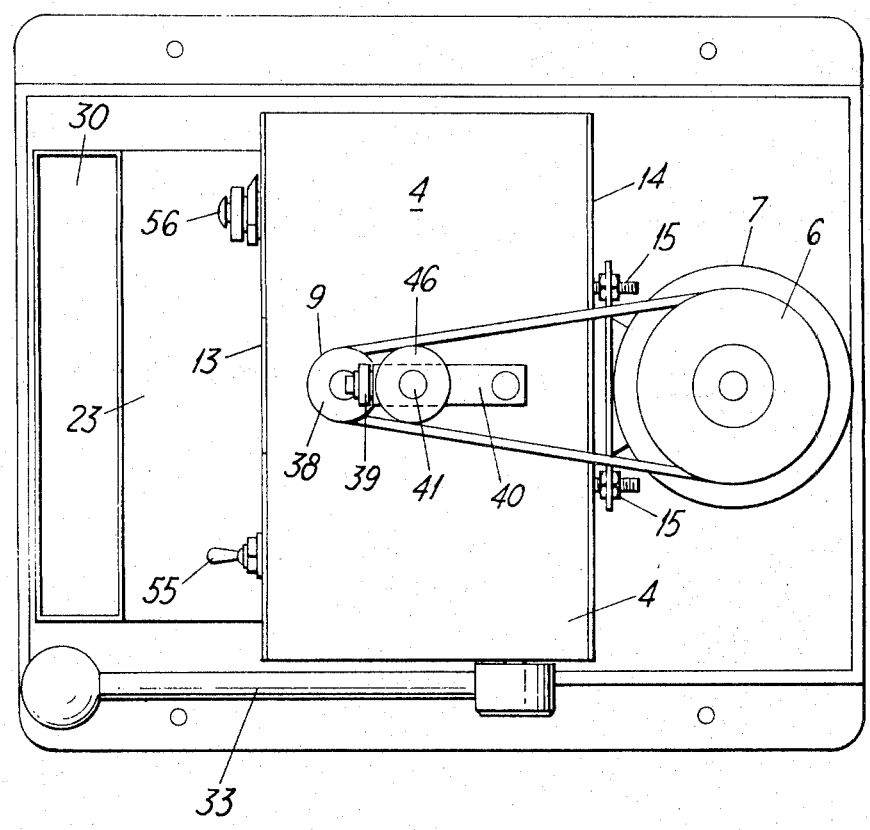

The invention will now be described by way of example with reference to the accompanying drawings in which:

FIG. 1 is a vertical section through a single spindle machine according to the invention;
FIG. 2 is a front elevation of the machine of FIG. 1;
FIG. 3 is a plan view of the machine of FIG. 1;
FIG. 4 is a section of the pulley and roller arrangement included in the machine of FIGS. 1 to 3 showing one form of face cam mechanism;
FIG. 5 is a front elevation of the mechanism of FIG. 4;
FIG. 6 is a plan view of the mechanism of FIG. 4;
FIG. 7 is a side view of another form of face cam;
FIG. 8 is a plan view of the cam of FIG. 7;
FIG. 9 is a vertical section through an alternative form of cam mechanism;
FIG. 10 is a front elevation of the mechanism of FIG. 9;
FIG. 11 shows an alternative form of cam for use with the mechanism shown in FIGS. 9 and 10;
FIG. 12 is a fragmentary view showing how a solenoid may be utilized in place of the arrangements shown in FIGS. 4 to 11 to apply blows in rapid succession to the machine spindle 1 of FIGS. 1, 2 and 3;
FIGS. 13, 14 and 15 are fragmentary views showing how rollers 39, corresponding to rollers 39 in FIGS. 4 to 9, may be arranged immediately beneath the pulley 9 of FIGS. 1, 2 and 3 for bringing about the imparting of an intermittently variable pressure on the machine spindle and therefore on the tool. Spindle 1 is omitted from FIG. 15 in order not to obscure roller 39.

The machine shown in FIGS. 1, 2 and 3 is a single spindle machine as previously stated but it is to be understood that the machine may also be built in a multi-spindle form.

The said machine comprises a vertical machine spindle 1 mounted in bearings 2 and 3 which permit both rotational and axial movement of the spindle. The bearings 2 and 3 are carried in upper and lower plates respectively 4 and 5 which, if desired, may be parts of a box casting. The spindle 1 is driven from a pulley 6 carried on the spindle of an electric motor 7 by means of a belt 8 which is trained around the pulley 6 and a pulley 9 mounted on the spindle 1 and keyed thereto by a grub screw 10. Plates 4 and 5 are at the top and bottom respectively of a box defined by the said plates by end walls 11, 12 and front and rear walls 13 and 14 respectively, the motor 7 being secured to the rear wall 14 by bolts and nuts 15. The box may, save for the front plate 13, take the form of a casting.

At its lower end the spindle carries a chuck or tool drive member 16. A tool 17 is carried in the member 16 and is guided in a bore 18 in a workpiece consisting of a fuel injection nozzle body 19 to engage the conical valve seating 20 at the inner end of the nozzle body. The nozzle body 19 is located in a nozzle body holder 21, which is conveniently made in reversible form (that is reversible from top to bottom) so that it may accommodate two different shapes of nozzle body. The nozzle body holder 21 is carried in a block 22 which in turn is movably supported on a platform 23. Platform 23 carries three pins 24 for locating the holder is a position such that when the holder containing a workpiece is slid rearwardly into position beneath the workpiece the bore of the workpiece is substantially in axial alignment with spindle 1 and tool drive member 16. The platform 23 is connected by two distance pieces 26 to a lower plate 27, the platform, distance pieces and plate 27 providing a slide movable on two vertical columns 28 located towards the side of the machine. Plate 27 bears upon a manually operated screw device, generally indicated by reference 29, by which the slide and therefore platform 23 may be raised and lowered. A small tank 30 is mounted at the end of the platform 23 for the receiption of cutting liquid into which the tools can be dipped to impregnate their abrasive tips or stones and to apply lubricant to their guide portions.

The lower plate 5 of the parts defining the abovementioned box, is mounted on the tops of columns 28 and on the top of a column 31 located towards the rear of the machine, columns 28 and 31 being supported by a base plate 32 which also supports the screw of the device 29. The abovementioned box is thus supported on the columns.

A hand lever 33 is carried on a spindle 34 which carries an arm 35. Mounted at the end of the arm 35 remote from the spindle 34 is a pin 36 which can engage a collar 37 fixed to the spindle 1, so that if the hand lever 33 is swung upwardly the arm 35 also swings upwardly and the pin 36 engages the collar 37 to raise the spindle 1 to enable the tool 17 to be withdrawn and a new workpiece (or atomizer nozzle body) to be inserted in the workholder.

The upper face 38 of the pulley 9 is engaged by a roller 39 mounted on a spindle carried at the end of a plate 40. A rod 41 is guided for vertical movement in upper and lower bearings 42 and 43 fitted respectively in the upper and lower plates 4 and 5. The plate 40 is coupled to the rod 41 by a pin 44 and is also engaged by a vertical guide rod 45 carried on the upper plate 4. A weight 46 is removable located on the rod 41 and rests on the plate 40. The upper surface 38 of the pulley 9 and the roller 39 are the co-operating parts of a cam and/or eccentric mechanism of which several forms are shown in FIGS. 4 to 11 and will now be described.

In one form of this mechanism, shown in FIGS. 4 to 6, the pulley 9 is formed with a radial step 47 and the roller 39 consists of an ordinary ball bearing. As the pulley 9 rotates the roller 39 rides up and down the step 47, thereby continually raising and lowering the weight 46. During this process the weight of the spindle 1 and the tool holding device 16 bear steadily on the tool 17, so that the tool remains in contact with the surface being machined, but the effective weight of the element 46 is effectively alternately increased and decreased — that is to say when the roller 39 rides up on the step 47 the weight on the spindle is momentarily increased because of the inertia of the weight 46 and the plate 40, and when the roller 39 rides down on the opposite side of the step 47 the weight bearing on the pulley 9 is momentarily decreased while the weight is dropping down over the step 47. Hence the effect is that the pressure with which the tool 17 is held in contact with the surface being machined is rapidly varied but contact is maintained throughout.

In FIGS. 7 and 8 the upper face 38 of pulley 9 is formed with two parallel steps, respectively 48 and 49, so that the rate at which the pressure acting on the tool 17 is varied is twice as rapid for a given rotational speed of the spindle.

In FIGS. 9 and 10 the upper face 38 of the pulley 9 is flat and the roller 39 (which, as stated, may be in the form of an ordinary ball bearing) has its outer diameter locally reduced at 50 so that it assumes a cam form having two steps 51 and 52 respectively. Hence when the pulley 9 is rotating the pressure on the tool 17 will be temporarily reduced when the reduced diameter portion 50 engages the face 38 of the pulley 9 and the pressure will be momentarily increased when the larger diameter portion of the roller 39 engages the face 38.

FIG. 11 shows a roller (or ball bearing) which is formed as a cam by removing a portion of the outer diameter between two points 53 and 54 by grinding this portion of the periphery of the roller 39 so that it is eccentric to the axis of the roller.

From the foregoing description it will be clear that while a part of the diameter of the roller which is concentric with the roller axis is in engagement with a flat part of the pulley face there is a steady pressure on the tool due to the weight of the spindle 1, the tool holder 16, the weight 46, the plate 40 and other associated parts. When a step on the roller or on the pulley face engages the pulley or roller there is a momentary increase in the pressure on the tool comparable with a sharp hammer blow. Moreover the weight 46 "bounces" on rod 41 and every time it drops on to plate 40 it imparts a "hammer" blow to the said plate which latter blow is transmitted to tool 17 by way of roller 38, machine spindle 1 and tool holder 16. Where a roller of the type shown in FIG. 11 is used the variation in tool pressure is small, and the magnitude of the variation may range from this small level to the equivalent of a sharp hammer blow, in dependence upon the height of the step or cam lobe, the speed of rotation of the rotating parts and the inertia of the parts which are moved vertically.

A switch 55, FIGS. 1, 2 and 3 is provided for switching the motor 7 on and off and an electric time switch 56 for controlling the motor is provided to enable articles to be machined for pre-determined timed periods, said switches being mounted on front plate 13.

While the means to vary the tool pressure and to "-hammer" the tool, shown in FIGS. 4 to 11 are all based on a roller running on the upper face of the pulley which drives the machine spindle, it will be obvious that other means may be devised to achieve the same effect, for example a solenoid comprising a vibratory core may be employed, the core being arranged to impart downwardly directed blows on to the spindle 1 or on to pulley 9, or the roller 39 may be arranged to contact with the under faces of the pulley. FIGS. 12 to 15 disclose such other means by way of example.

In FIG. 12 elements corresponding to those shown in FIGS. 1, 2 and 3 have been given like reference numerals. In place of the rollers and steps platform 40a bears a solenoid comprising coil 57 and core 58, the core being in alignment with and resting on the spindle 1 when the coil is not energized An arm 59 rigidly carried by the top of the spindle has one end overlying the top of the core in slightly spaced relation in order to allow the core to have limited upward movement with respect to the spindle.

When the coil is energized by rapidly fluctuating electric current (alternating current or direct current which is rapidly interrupted by a make and break device for example) the core 58 rapidly reciprocates or vibrates vertically with the result that rapidly intermittent variable axial pressure, in the form of taps in rapid succession, is applied to the spindle 1 and holder 16 and so to a tool when in holder 16.

In FIGS. 13, 14 and 15 the pulleys and rollers have been given the same reference numerals as corresponding elements in FIGS. 4 to 11. In FIGS. 13, 14 and 15 rollers 39 are beneath the pulleys 9 as previously stated; their profiles engage the underfaces of the pulleys 9. The spindles of the rollers are carried by arms 40 which are rigidly mounted in the machine. For example, they may be fixedly secured to top plate 4, FIGS. 1, 2 and 3.

When pulley 9 is rotating step 47, FIG. 13, strikes roller 39 so that the pulley 9 receives a rapid upwardly directed blow or tap which causes the pulley 9, spindle 1, the workholder at the bottom of spindle 1 and a tool in the workholder to rise, whereafter the pulley 9, spindle 1, tool holder and tool fall so that the tool when in a workpiece imparts a blow to the surface being machined. Pulley 9 may have more than one step on its underface, e.g., two, like steps 48 and 49, FIGS. 7 and 8.

In FIG. 14 the leading step, 51 or 52 according to the direction of rotation of the roller, has much the same effect as the step 47, FIG. 13, the under surface of the roller being plane. Thus when the leading step strikes the under surface of the pulley the latter rises and thereafter drops so that a tool in the holder imparts a blow to the surface being machined.

In FIG. 15, roller 39, by contact with the plane undersurface of the pulley 9 when the latter is rotating lifts the pulley, spindle 1, workholder and tool and then allows these elements to drop so that the tool tip strikes the surface being machined.

The height of the steps shown in FIGS. 4, 5, 6, 7, 8, 9, 10, 13, 14 and 15 has been exaggerated for the sake of clarity and so has the throw of rollers 39, FIGS. 11 and 15. In practice it has been found that a depth or throw of 0.002 inch gives good results when the tool is rotating at 4,000 r.p.m. These figures are not to be regarded as limitations however. For example, the throw or depth may be within the range 0.001 to 0.003 inch or within a range less than 0.001 inch and greater than 0.003 inch, and the tool may rotate at rates higher or lower than 4,000 R.P.M., provided the desired effect is attained in practice, i.e., a vibratory action or intermittently variable load is applied to the tool while it is rotating.

Spindles 1, FIGS. 13, 14 and 15 may have extensions at their upper ends for the reception of removable weights which weights may be free to "bounce" slightly on the extensions.

I claim:

1. A machine for use in machining internal surfaces of workpieces comprising a workholder to hold a workpiece which is to be machined, a substantially vertical machine spindle mounted for rotation, a tool holder mounted at one end of the machine spindle to hold a tool so that the tool rotates when the machine spindle rotates, a support for the workholder, the said support and the tool holder being relatively movable towards and away from each other, an element rotatable with the machine spindle and having a surface perpendicular to the machine spindle axis, a roller carried on a spindle and mounted to run on the said surface when the machine spindle rotates, and a weight bearing upon the spindle carrying the roller, the said surface and the periphery of the roller being formed to cause the roller to rise and fall as it rotates and thereby to vary the axial pressure on the tool intermittently without withdrawing the tool from contact with the workpiece.

2. A machine according to claim 1 wherein the means for intermittently varying the axial pressure on the tool comprises means to impart axially-directed taps to the machine spindle.

3. A machine according to claim 1 wherein the element rotatable with the machine spindle comprises a pulley fixed to the machine spindle for driving said spindle, said roller being rotatable on an upper surface of the pulley.

4. A machine according to claim 3 wherein at least one step is formed on the upper surface of the pulley whereby the roller rises and falls as it runs over the step on the pulley.

5. A machine according to claim 1 wherein the surface is the upper surface of a driving pulley mounted on the machine spindle and the periphery of the roller is provided with at least one step.

6. A machine according to claim 1 wherein the roller periphery is eccentric with respect to the axis of rotation of the roller.

7. A machine according to claim 1 wherein the weight is supported on the platform having a spindle for the roller attached to one end thereof, said platform being mounted by means permitting it to move upwardly and downwardly.

8. A machine according to claim 7 wherein the weight is mounted on the platform by means permitting it to rise and fall relatively to the platform.

* * * * *